United States Patent [19]
Anderson et al.

[11] 3,835,741
[45] Sept. 17, 1974

[54] DEVICE FOR CUTTING SHEET MATERIAL

[75] Inventors: Gunnar Walter Anderson; Willie Eriksen, Oslo, both of Norway

[73] Assignees: Sentralinstitutt for industrielli forskning, Oslo; A/S Kongsberg Vapenfabrikk, Kongsberg, both of, Norway; part interest to each

[22] Filed: June 15, 1972

[21] Appl. No.: 263,290

[30] Foreign Application Priority Data
June 16, 1971 Norway................................ 2266/71

[52] U.S. Cl............................. 83/71, 83/169, 83/559, 83/684, 83/697, 83/916, 83/925 CC
[51] Int. Cl............................. D06h 7/00, B26d 1/10
[58] Field of Search.......... 30/228; 83/916, 169, 71, 83/559, 560, 925 CC, 684, 697

[56] References Cited
UNITED STATES PATENTS

| | | | |
|---|---|---|---|
| 1,172,058 | 2/1916 | Scheyer | 83/925 CC |
| 2,217,393 | 10/1940 | Webb | 83/916 X |
| 2,869,231 | 1/1959 | Gury, Jr. | 83/169 X |
| 2,888,744 | 6/1959 | Yermish | 30/228 |
| 3,033,312 | 5/1962 | Enders | 83/169 |
| 3,144,798 | 8/1964 | Leibinger | 83/916 X |
| 3,245,295 | 4/1966 | Mueller | 83/925 CC |
| 3,477,322 | 11/1969 | Gerber et al. | 83/71 |
| 3,664,217 | 5/1972 | Schiewek et al. | 83/916 X |

Primary Examiner—J. M. Meister
Attorney, Agent, or Firm—Holman & Stern

[57] ABSTRACT

A cutterhead for mounting in a numerically controlled machine moving the head in a desired path along a cardboard or thin metal sheet material. The cutter head has a cutting tool in the form of a punch having a circular cross-section and reciprocating at a frequency of at least 25,000 cycles per minute.

6 Claims, 5 Drawing Figures

DEVICE FOR CUTTING SHEET MATERIAL

BACKGROUND OF THE INVENTION

The present invention relates to a device for cutting sheet material, comprising a cutter head having a cutting tool which is reciprocated substantially normal to the sheet material, which rests on a stationary support, with the cutter head being arranged for being automatically moved along the desired cutting line by being controlled along two coordinates.

PRIOR ART

Such a device is known from U.S. Pat. No. 3,477,322. As an example of cutting tools which may be used, the specification specifies a saw blade, but circumstances relating to the supporting of the sheet material to be cut and the design of the apparatus used for automatically moving the cutter head along two coordinates, makes it desirable to let the sheet material rest on a support made of rubber or a similar resilient material, and to use a cutting tool which penetrates the material and is pressed somewhat into the support material of rubber or the like, without cutting the support. In U.S. Pat. No. 3,477,322, the preferred cutting tool is therefore stated to be a tool with a sharp, straight knife edge. Both a saw blade and such a knife edge must be turnable around the axis of the reciprocating movement in order to follow the desired cutting line. This constitutes an additional complication mechanically as well as with respect to the control of this turning, and, besides, the mass of the reciprocating parts will be large, which is a disadvantage for even operation at high frequencies of the reciprocating movement.

The sheet material primarily intended to be cut is a sturdy, tough cardboard of the type which is often used as templates when cutting other materials such as textiles in the clothing industry. It has been found that a knife edge of the type illustrated in U.S. Pat. No. 3,477,322 easily gets stuck in such a material, since the tool must, of course, have an increasing cross-section from the sharp cutting edge inwards, and therefore easily wedges in the narrow cut which is obtained when using such a cutting tool, which after all does not remove any material. A presser foot or the like is, therefore, required for retaining the material when the knife is lifted, pulling the material off the knife.

SUMMARY OF THE INVENTION

The object of the present invention is to provide a device of the type initially referred to, in which these disadvantages are eliminated, the device having a very simple design and not requiring any turning of the cutting tool, while also being able to cut without difficulties the cardboard as well as other thin sheet or plate materials, e.g., metal plates, at a speed of at least 10 m/min without the cut edge becoming unsatisfactory.

The device according to the invention is primarily characterized in that the cutting tool is a punch which removes bits of the sheet material, and which cuts equally well in all directions. The punch preferably has a circular cross-section.

Thereby, it becomes unnecessary to turn the cutting tool. The width of the punched track (the diameter of the punch) can be kept so small (less than 2 mm) that for many applications it will be possible to let the punch follow the theoretical cutting line, disregarding the resulting small deviation from the desired form. If it is of importance that the cut pattern or the like is as accurate as possible, it is not difficult to make the axis of the punching tool follow a curve which lies somewhat outside the desired contour of the piece of material to be cut out.

When using a punch with a particularly small diameter, the requirement that the cutting speed should be at least 10 m/min without the cut edge becoming too uneven, implies that the cutting tool must be reciprocated at a very high frequency. According to the present invention, the means for moving the cutting tool up and down is therefore of such a type as to permit movement of the cutting tool at a frequency of at least 25,000 cycles per minute. The punch diameter may then be right down to 0.5 mm without the cutting speed going below 10 m/min. However, with a punch diameter of 0.2 mm the punching frequency should be higher than 25,000 cycles per minute if an approximately smooth edge is desired. A high punching frequency is, of course, desirable also with larger punch diameters, as the cutting speed may then be increased even more. However, substantially higher punching frequencies than 25,000 cycles per minute require quite special constructions.

The cutter head according to the present invention may be used in a numerically controlled machine for moving the cutter head in a plane perpendicular to the longitudinal axis of the cutting tool, e.g., in a machine as described in U.S. Pat. No. 3,477,322 or U.S. Pat. No. 3,293,651. However, it is contemplated to use the cutter head of the invention above all for attachment to a numerically controlled drafting machine of the type which is manufactured and marketed by A/S Kongsberg Vapenfabrikk under the trademark "Kingmatic," and which is described i.a. in Teknisk Ukeblad, volume 113 (1966), page 812–814, in "Automobile Engineer", April 1969 and in a paper: "Numerically Controlled (NC) Draughting Machines" read by T. Brataas during a Computer Graphic Seminar in Roros on the 14th to 16th May 1968. Since generally known numerically controlled drafting machines are referred to, it should not be necessary to describe in detail the apparatus for two-dimensional control of the cutter head along the desired cutting line.

Therefore, in the following specification there will merely be given a detailed description of an embodiment of the cutter head having a reciprocating cutting tool and the means for effecting the reciprocating movement.

DETAILED DESCRIPTION OF THE PREFERRED EMBODIMENT

Figure 5:
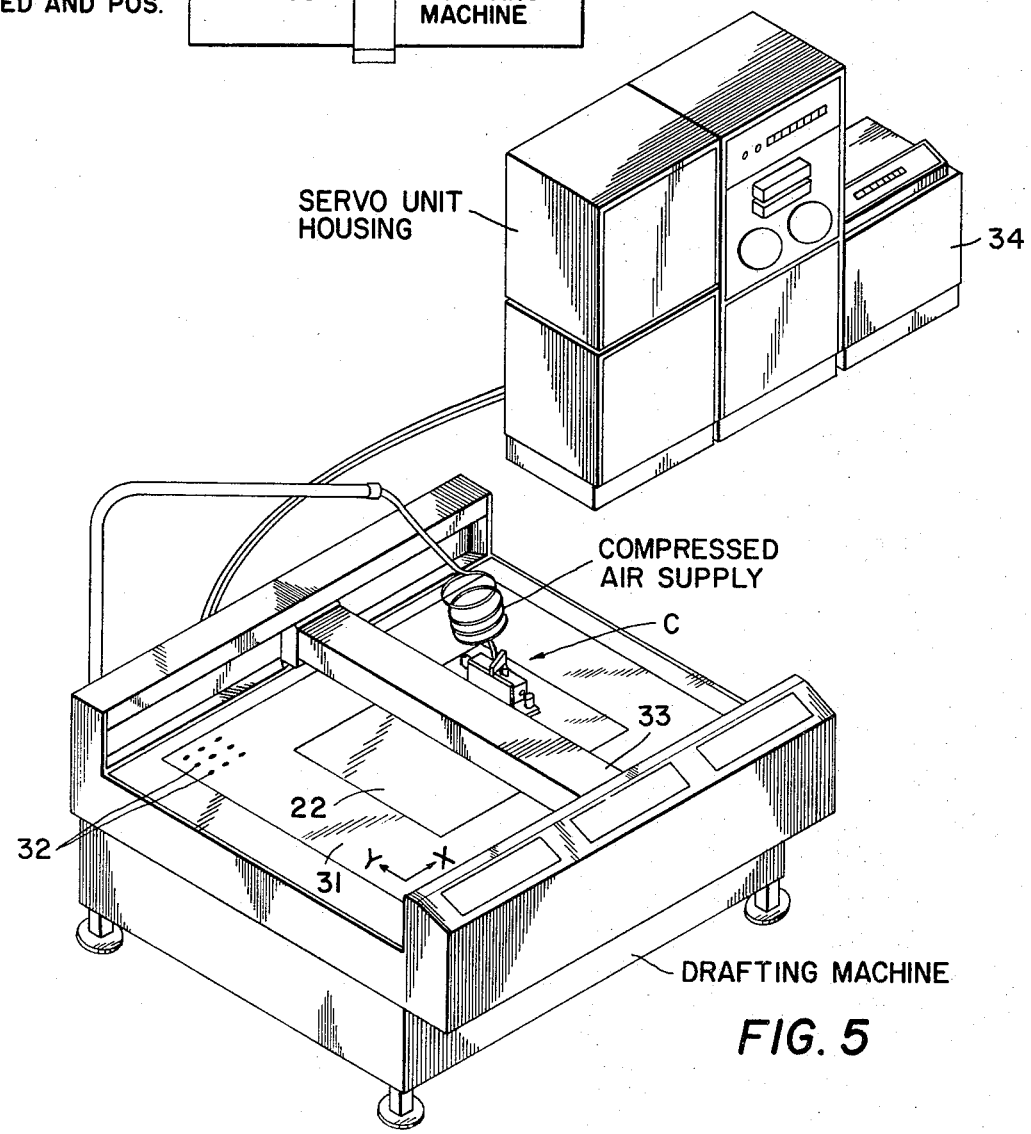
FIG. 5 is a perspective view showing a cutting device embodying the invention.

As shown in FIG. 5, a cutting head is denoted generally C and a sheet of material to be cut by the cutter head is denoted 22. The plotter includes a table 30 having a surface 31 over which the cutter head C is moved, with the surface 31 supporting the sheet material. The surface 31 may be of rubber or other resilient material and the sheet material 22 is held to the surface 31 by a vacuum hold-down defined by a plurality of small openings 32 distributed over the entire extent of the surface 31 and communicating with a suitable vacuum source.

A carriage 33 is mounted on the table 30 for movement relative thereto in the direction of the X-axis and the cutter head C is mounted on the carriage for movement therealong in the direction of the Y-axis. By virtue of the carriage and cutter head mountings, it will be appreciated that the cutter head C may be moved to any point on the sheet material 22.

A computer or similar controller 34 is provided for controlling the movement of the cutter head along the line to be cut, the operation of the cutter, and the shifting of the cutter head between a cutting condition and a non-cutting condition. The computer may be of any suitable type known in the art and functions to generate command signals transmitted to the cutter head and the driving motors.

The cutter head C according to the invention consists of a housing 1, in which there is installed a high-speed air motor 2 which may be operated at a speed of 25,000 rpm. The air motor 2 has a conventional design and is supplied with compressed air through a hose (not shown) to a nipple 3. The exhaust air from the motor is discharged into the housing 1 and escapes through holes 4 in an end cover 5. The housing carries two cylindrical bearing pins 6 for a movable or floating mounting of the device of the invention on the numerically controlled drafting machine.

Figure 1:
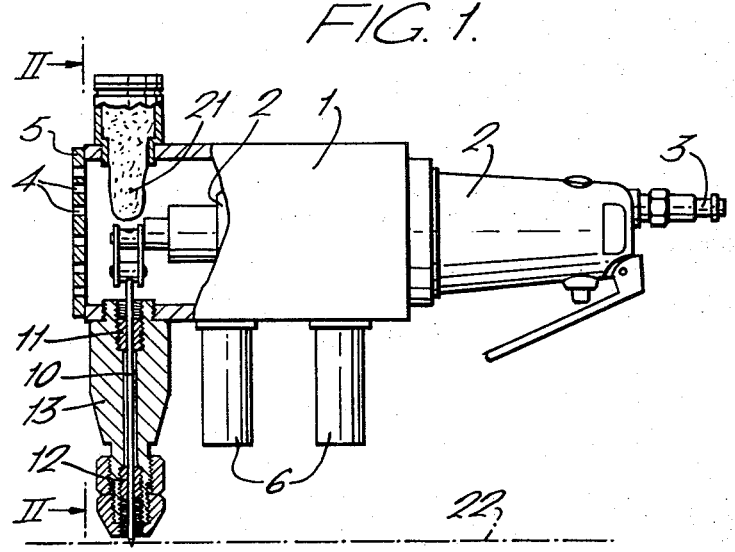
FIG. 1 is a side view, partly in section, of a device according to the invention for mounting on the movable head in a numerically controlled drafting machine.
Figure 2:
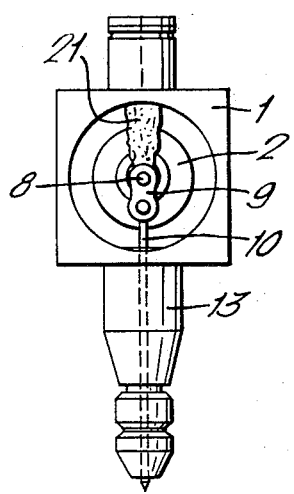
FIG. 2 is a sectional view of the device taken along the line II—II in FIG. 1.
Figure 3:
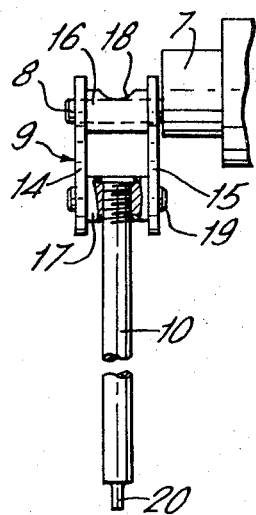
FIG. 3 illustrates a detail of FIG. 1 on a larger scale.
Figure 4:
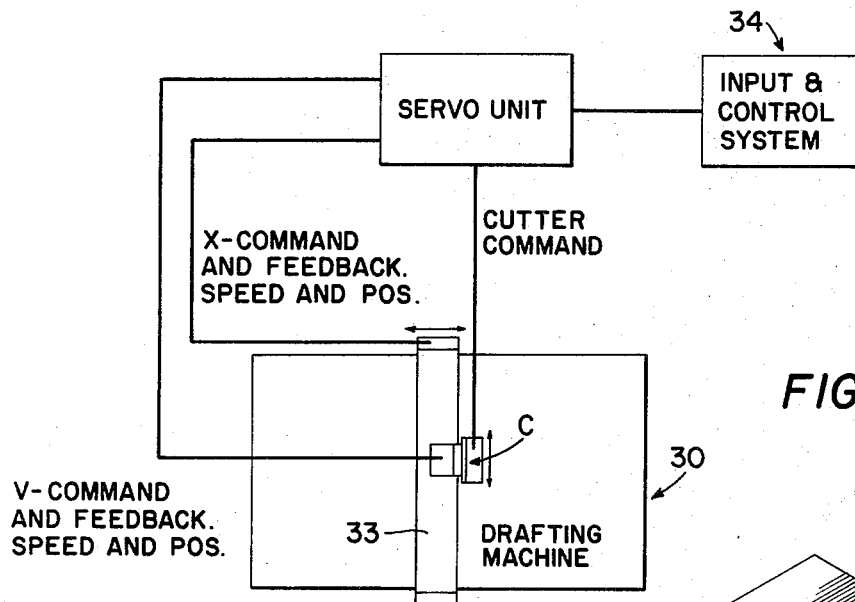
FIG. 4 is a schematic diagram of the control system.

As best shown in FIG. 3, an eccentric pin 8 is mounted on the shaft 7 of the air motor. The eccentric pin 8 is, by means of a connecting rod 9, connected to the upper end of a piston 10 mounted in upper and lower bearings 11 and 12 in a guide 13 which extends downwards from the housing 1. The rod 9 is shaped similar to a chain link and consists of two plates 14, 15 and two bearing sleeves 16 and 17. In the portion of the circumference of the sleeve 16 remote from the piston 10, there is provided a recess 18 exposing the eccentric pin 8. The object of this will be explained later. The piston 10 is connected to the lower part of the connecting rod 9 by insertion through a hole in the sleeve 17 and by threading into a threaded bore in a bearing pin 19 within the sleeve 17. The lower part of the piston may in itself serve as a punch, but may also be equipped with a punch 20 of ceramic metal as indicated in FIG. 3.

At the high rotational speeds it is a great problem to obtain a lubrication between the sleeve 16 and the eccentric pin 8. However, it has been found that a satisfactory lubrication can be obtained by means of a string 21 of felt which is soaked with oil, and which extends so far into the housing 1 that the portion of the eccentric pin 8 exposed by the recess 18 in the sleeve 16 will touch the felt string 21 at each revolution thereby receiving a small quantity of lubricant.

When using a punch as shown in the present specification, the end of the punch will be retained by the sheet material against movement in the plane of the latter as soon as the punch engages the sheet material. However, the head of the numerically controlled drafting machine will move continuously. It is, therefore, necessary to permit the punch or the piston to yield in the direction of movement of the cutter head. This is the reason why the lower bearing 12 for the piston 10 is positioned somewhat above the end of the guide 13. The piston 10 can therefore flex elastically between the lower bearing 12 and the upper surface of the sheet material 22 to be cut. The bearing 12 does not, however, have to lie at a further distance above the sheet or plate 22 than necessary for ensuring that the punch will not break. The bearing 12 and even the bearing 11 are therefore made adjustable in the axial direction by being threaded into the guide 13.

Also laminated wooden boards and chipboards have been tried as a punching support for the sheet material 22, and especially chipboards have proved suitable as a support.

The device according to the invention has been tried for cutting a very tough cardboard of the type used as templates in the clothing industry. The cardboard had a thickness of about 0.7 mm. It was possible to work with a cutting speed far above 10 m/min while obtaining a very smooth edge (punch diameter 2 mm). The punch cut equally well in all directions. The feed pressure was very low.

Tests have also been carried out with a punch diameter of 0.6 mm. The cutting speed and the quality of the cut were still acceptable. Good results have also been obtained in the cutting of 0.5 mm aluminium plate.

What we claim is:

1. A device for cutting sheet material comprising a stationary flat support of yielding material on which the sheet material rests, a cutter head having a cutting tool, means mounting the cutting tool for high-speed reciprocation substantially normal to the sheet material resting on the flat support, said cutting tool removing bits of the sheet material and being pressed slightly into the support material, means mounting the cutter head for movement parallel with the sheet material, said movement being automatically controlled along two coordinates in accordance with a desired cutting line, and said cutting tool being constituted by a punch having an approximately circular cross-section and cutting equally well in all directions, whereby the cutting may be effected along the desired cutting line without rotating the tool about the axis of reciprocation.

2. The cutting device as claimed in claim 1 in which a means for reciprocating the cutting tool is a power source permitting movement of the cutting tool at a frequency of at least 25,000 cycles per minute, whereby a small cross-section of the punch and a cutting speed of at least 10 meter per minute can be obtained without the cut edge becoming too uneven.

3. The cutting device as claimed in claim 1 in which said means mounting the cutter head for movement parallel with the sheet material is a numerically controlled drafting machine having a drafting head, the cutter head being attached to said drafting head and said stationary flat support being attached to a drafting table of said numerically controlled drafting machine.

4. The cutting device as claimed in claim 1 in which an air motor having a shaft defines the means for reciprocating the cutting tool, an eccentric pin on the shaft of the air motor, a connecting rod mounted on the eccentric pin, the tool having an upper end and means connecting the upper end of the tool of the connecting rod.

5. The cutting device as claimed in claim 4 including an upper bearing for the connecting rod, said upper bearing being mounted on the eccentric pin and provided with a recess exposing a portion of the eccentric pin, and a porous material saturated with a lubricant positioned so as to be contacted by the exposed portion of the eccentric pin during rotation thereof for lubricating the upper bearing.

6. The cutting device as claimed in claim 1 including mounting means for the punch located at such a distance from the lower end of the punch to allow elastic yielding thereof in accordance with the movement of the cutter head during the period of engagement of the punch with the sheet material.

* * * * *